United States Patent Office 3,511,218
Patented May 12, 1970

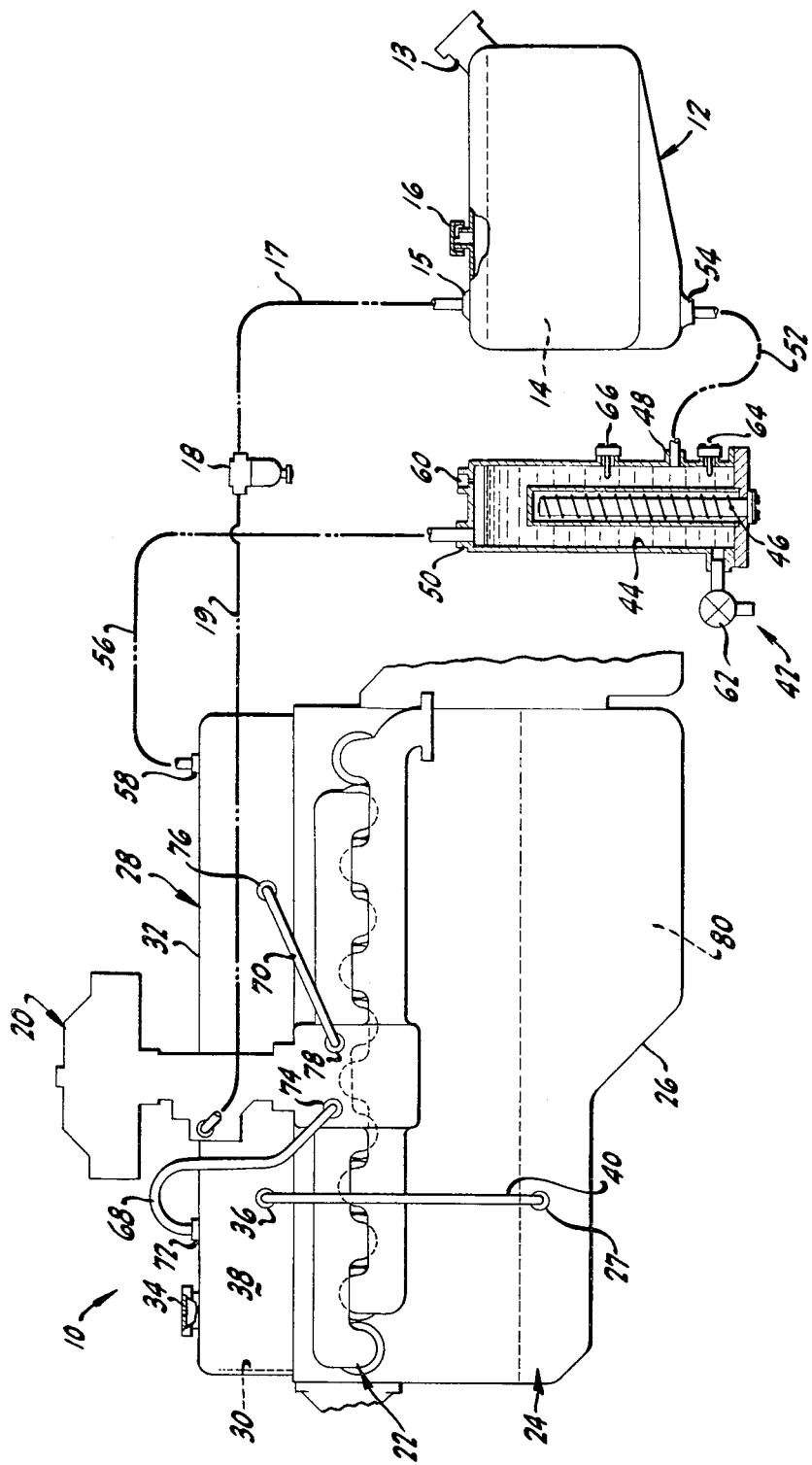

3,511,218
FUEL COMBUSTION SYSTEM
Anthony M. Lazaros, 20 Monroe St.,
San Francisco, Calif. 94108
Filed Feb. 14, 1967, Ser. No. 616,092
Int. Cl. F02b 75/12
U.S. Cl. 123—119
6 Claims

ABSTRACT OF THE DISCLOSURE

The present invention provides a fuel-combustion system for an internal-combustion engine. In accordance with this system, a distillation column produces hot vapors of fuel drawn from the engine fuel tank. Such vapors are conducted through a chamber and to the inlet manifold for introduction into the engine cylinder. Similarly introduced into this chamber are vapors of a particular crankcase lubricant composition. The introduced vapors assure more complete fuel combustion with resultant increase in engine efficiency, and a decrease in the toxic gases in the engine exhaust fumes. The lubricant compound contains at least glycol, colloidal graphite and alcohol.

BACKGROUND OF INVENTION

The present invention relates to internal-combustion engines; and, more particularly, to a system for improving the combustion of fuel in such engines and substantially eliminating pollutants from the exhaust. A problem has existed in the prior art with respect to the operation of internal-combustion engines. In such operation, the fuel has not been completely burned in the combustion chambers of the engine cylinders. As a consequence, maximum efficiency of engine operation has not been obtained. At the same time, toxic gases have been emitted into the atmosphere, thus contributing to the modern problem of atmospheric pollution. This pollution by engine exhaust is also caused by discharge of partially-burned lubricating oil.

Attempts have been made to improve the engine efficiency of internal-combustion engines. One approach to this problem is the use of fuel-injection systems. Still, engines which incorporate fuel-injection systems, such as the diesel engine, have proven quite costly for general use, as in automobiles. Too, attempts have been made in the prior art to eliminate the contribution made by internal-combustion engines to the atmospheric-pollution problem. One approach has been the use of filters in engine-exhaust lines. Such filters, however, have not proven to be very efficient in use. A particular problem has been the elimination from the exhaust gases of the oxides of nitrogen. Alternative solutions, including recycling of exhaust gases, seem also to fall short of providing requisite decontamination of exhaust.

SUMMARY OF THE INVENTION

The present invention provides a fuel-combustion system and a lubricant for internal-combustion engines which are designed to overcome the disadvantages connected with the problem of incomplete combustion of petroleum products, including fuel and lubricants entering combustion chambers.

In accordance with this invention, advantage is taken of the presence of two materials required for engine operation: the fuel employed and the crankcase lubricant. Vapors of the fuel and of a modified lubricant are introduced into the combustion chambers of the engine cylinders. There is accomplished by the foregoing not only a more complete combustion of fuel itself, but, also, a complete burning of lubricant vapors, so as to substantially eliminate the exhaust of pollutants from both fuel and lubricant.

BRIEF DESCRIPTION OF THE DRAWING

The drawing is a vertical cross-sectional view, being partly broken away and being somewhat diagrammatic, of an internal-combustion engine which has been modified in accordance with the present invention.

DESCRIPTION OF THE PREFERRED EMBODIMENT

In the drawing there is shown an internal combustion engine 10 of the type conventionally employed in automobiles. The engine 10 is equipped with a fuel tank 12, having an inlet 13 and containing a gasoline 14. The tank 12 has an upwardly-opening outlet 15, and is equipped with an air vent 16 of comparatively small size. The outlet 15 is connected by means of a pipe 17 to the inlet side of a fuel pump 18 which is of conventional design and may include a filter. The fuel pump 18, at its outlet side, is connected by a pipe 19 to a conventional carburetor 20. The carburetor 20 feeds into an inlet manifold 22, of conventional character, which is mounted onto the engine casing 24. The casing 24 encloses the engine cylinders (not shown); and at the bottom thereof there is attached a crankcase 26. This invention provides an outlet opening in the crankcase 26, as seen at 27, for purposes explained below. Mounted above the casing 24 is a cylinder head or valve cover 28. The cover 28 is of hollow, closed formation; and thus defines a chamber 30. The cover 28 is provided in the top wall 32 thereof with an air vent 34 of comparatively small diameter. The present invention provides an inlet opening 36 in one of the sidewalls 38 of the cover 28, and a pipe or tube 40 interconnects this opening with the crankcase opening 27.

The present invention provides a distillation column 42 mounted with the top thereof at the same vertical height as the top of the fuel tank 12. The column 42 includes a distillation chamber 44 within which is mounted a heating element 46. The column 42 is formed with an inlet opening 48 near the bottom of the chamber 44, and an outlet opening 50 atop the chamber 44. The inlet opening 48 is connected by means of a pipe 52 to a bottom-wall outlet 54 of the fuel tank 12, so that the chamber 44 is filled with fuel to the same level as the tank. The chamber outlet opening 50 is connected by means of a pipe 56 to an inlet opening 58 located in the top wall 32 of the cover 28. The column 42 is provided with an upwardly-opening vent 60 which is of very small diameter. The column 42 is also provided with a bottom drain 62 for the removal of sludge from the column. Located adjacent the inlet opening 48 and within the chamber 44 is a first thermostat 64. A second thermostat 66 is mounted within the chamber 44 at a suitable position near the bottom of the chamber.

Communication is provided between the cylinder head cover 28 and the inlet manifold 22, or carburetor connection thereto, by means of two pipes 68 and 70. The pipe 68 may be located adjacent the inlet opening 36 and extends between an outlet opening 72 in the top wall 32 of the cover 28 and an inlet opening 74 in the manifold 22. The pipe 70 may be located adjacent the inlet opening 58 and extends between an outlet opening 76 in the sidewall 38 of the cover 28 and an inlet opening 78 in the manifold 22.

Contained in the crankcase 26 is a lubricant composition 80, formulated in accordance with the present invention. The lubricant 80 contains at least the following materials: (1) A lubricant base suitable for lubrication use in the crankcase 26; and (2) a glycol selected from the group consisting of diethylene glycol, triethylene glycol, propylene glycol, tetraethylene glycol, dipropylene glycol and hexylene glycol. The lubricant base employed in the lubricant composition 80 may be of any type suitable for use in a crankcase. However, it is preferred that a lubricant base be employed which is formulated of (a) glycerine, (b) colloidal graphite, (c) a monohydric alcohol and (d) sodium bicarbonate.

The glycerine and the graphite constituents of the preferred base for the composition 80 together serve as lubricants. The amount of glycerine employed is preferably within the approximate range of 25% to 50% (weight percentage, based upon the total weight of the lubricant composition 80). The graphite is colloidally suspended in the glycerine, and preferably has a particle size within the approximate range of 250 to 500 mesh. The amount of graphite present is preferably within the approximate range of 1.0–4.0% by weight of the total compound. The alcohol constituent serves primarily to lower the freezing point of the composition 80, so that the latter will be useful at low temperatures. Although any suitable monohydric alcohol may be employed, methyl alcohol is the preferred constituent. The amount of alcohol present is preferably within the approximate range of 10% to 50%. The presence of sodium bicarbonate in the lubricant composition 80 serves to prevent corrosion of those parts of the engine 10 with which the lubricant composition 80 comes into contact. The use of approximately 1.0 to 2.0% of sodium bicarbonate is preferred.

As will be made more clear hereinbelow, the glycol constituent of the composition 80 serves to increase the degree of combustion of the fuel 14 in the combustion chamber of the engine 10. The following mixture of glycols may be employed, having the composition indicated (based upon the total weight of the lubricant composition 80):

| Glycol constituent: | Approximate weight composition, percent |
|---|---|
| Diethylene glycol | 5 |
| Triethylene glycol | 5 |
| Propylene glycol | 21 |
| Tetraethylene glycol | 5 |
| Dipropylene glycol | 8 |
| Hexylene glycol | 2 |
| Total glycol composition | 46 | it is possible in accordance herewith to eliminate any, or a number, of the separate glycols listed above, or to substitute other glycols.

In the operation of the engine 10, fuel 14 is initially fed into the tank 12 through the inlet opening 13 in the conventional manner. The engine 10 is then set into operation, likewise in conventional manner. Fuel 14 is thus drawn from the tank 12 by means of the pump 18 and through the outlet opening 15 and the pipe 17. Air admitted through the air vent 16 serves to maintain suitable pressure conditions within the tank 12. The fuel 14 is pumped through the pipe 19 and into the carburetor 20. In the carburetor 20, the fuel 14 is mixed in conventional manner with air. The air-fuel mixture thus produced is introduced into the inlet manifold 22.

Simultaneously with the operations above described, fuel 14 is withdrawn from the tank 12 by gravity flow through the outlet opening 54 and the pipe 52. Such fuel 14 is conducted into the distillation column 42 through the inlet opening 48 of the latter. In the chamber 44 of the column 42, the fuel 14 is heated by the heating element 46. The hot fuel vapors or fumes thus produced are conducted from the chamber 44 through the outlet opening 50 and into pipe 56.

Control of the heating of the fuel 14 within the chamber 44 is accomplished by the use of the thermostats 64 and 66. If the fuel 14 is a gasoline of conventional type, it is heated to a preferred temperature of the order of 180° F. The hot vapors are produced at a preferred rate within the approximate range of 170° F. to 200° F. The minute vent 60 aids in the maintenance of suitable pressure conditions within the chamber 44.

The hot fuel vapors are introduced by the pipe 56 through the inlet opening 58 into the chamber 30 of the cylinder head cover 28, and are generally at a temperature of the order of 145° F. to 150° F. upon entering the chamber. The vapors are then drawn from the chamber 30 through the pipes 68 and 70 into the hot inlet manifold 22 by the vacuum therein. In the manifold 22, the hot fuel vapors become mixed with the air-fuel mixture received from the carburetor 20. The hot fuel vapors are thus introduced into the combustion chambers of the cylinders of the engine 10 along with the air-fuel mixture. This produces a marked increase in combustion, so that more complete fuel burning and energy release is attained.

During the operation of the engine 10, the heat which is conventionally generated thereby serves to heat the lubricant composition 80, and thus to produce some evaporation thereof. The vapors thus generated are conducted through the crankcase outlet opening 27 and into the pipe 40. From the pipe 40, the vapors are drawn through the inlet opening 36 and into the chamber 30. Within the chamber 30 the vapors mix with the fuel fumes and are drawn by vacuum through the outlet pipes 68 and 70 into the inlet manifold 22. The vapors of the lubricant composition are then introduced into the combustion chambers of the cylinders of the engine 10, along with the air-fuel mixture and the hot fuel vapors.

The presence of the hot fuel vapors within the combustion chambers of the cylinders of the engine 10 serves to provide more complete fuel combustion. As a consequence, the operation of the engine 10 is improved, particularly with respect to the work output obtained per unit quantity of fuel 14 employed.

The lubricant composition 80 not only operates as an unusually good crankcase lubricant, but also serves as a source of additional vapors for improving the combustion of the air-gas mixture in the chambers of the cylinders of the engine 10. Insofar as the lubrication function of the composition 80 is concerned, the latter offers a combination of advantageous features. Thus, the mixture of glycerine and graphite provides unusually good lubrication. At the same time, the rate of loss of glycerine through evaporation is unusually low, as compared with conventional lubricating oils. As has been previously indicated, the alcohol constituent lowers the freezing point of the lubricant composition 80. The sodium bicarbonate operates as a corrosion-preventive agent.

With respect to the function of the vapors of the lubricant composition 80 in providing more complete combustion of the air-fuel mixture in the combustion chambers of the cylinders of the engine 10, two advantageous results are obtained. Firstly, the increase in the degree of combustion here aids in improving the general performance of the engine 10. Secondly, such increase eliminates from the engine exhaust fumes a number of undesirable constituents. The constituents thus eliminated are those which are normally primarily responsible for atmospheric pollution.

Further with regard to the lubricant, it is noted that the alcohol prevents unduly high viscosity at low operating temperatures and vapors thereof help ignition in the combustion chamber. Diethylene glycol serves to limit "thinning out" of the lubricant at high temperature, while triethylene glycol limits evaporation of the lubricant and vapors serve to delay ignition. The vapors of the propylene glycol constituent prevent the formation of dioxide gases, such as, e.g., carbon dioxide and sulphur dioxide. In the absence of the dioxides, more complete combustion of other toxic gases, such as, e.g., carbon monoxides, hydrogen and the oxides of nitrogen, is assured. The vapors of the tetraethylene glycol and hexylene glycol constituents have good wetting properties. As a consequence, these vapors readily penetrate many of the toxic gases, particularly the hydrocarbons. More complete combustion of such gases is thus assured. The vapors of the dipropylene glycol constituent serve to insure more complete combustion of hydrocarbons, the oxides of nitrogen and the dioxide gases. It is thus to be appreciated that the exact composition of the lubricant compound may be varied for different climates, for example, and to achieve particular results for different conditions.

When the fuel combustion system of the invention has been employed in conjunction with the operation of automobile engines, greatly improved performance of such engines has been obtained. Thus, the gas mileage obtained has been increased to as much as 45–60 miles per gallon. At the same time, the engine exhaust fumes have exhibited a remarkably low content of toxic gases. Thus, the carbon monoxide content has been reduced from the conventional average of more than 3.0 percent, to less than 0.005 percent. The amount of oxides of nitrogen present has been reduced from the conventional average of about 1,400 parts per million to less than 50 parts per million. The amount of hydrocarbons present has been reduced from the conventional average of about 800 parts per million to about 10 parts per million. The amount of dioxide gases and other toxic gases has been similarly greatly reduced. The foregoing results were obtained by test with a lubricant having the following constituents by weight:

| | Percent |
|---|---|
| Methyl alcohol | 10 |
| Diethylene glycol | 5 |
| Triethylene glycol | 5 |
| Glycerine | 39 |
| Propylene glycol | 20 |
| Tetraethylene glycol | 5 |
| Dipropylene glycol | 8 |
| Hexylene glycol | 5 |
| Graphite | 2 |
| Sodium Bicarbonate | 1 |

The foregoing is set forth only as an example, and not by way of limitation.

It is to be appreciated that in use the various constituents of the lubricant do not evaporate at the same rate. Naturally, the more volatile constituents evaporate more rapidly; and, in fact, the graphite does not appreciably leave the crankcase. Thus, after initial charging or filling of the crankcase with lubricant, subsequent additions thereto are made with a compound having a much greater percentage of volatile constituents and preferably no graphite. It is the lubricant composition within the crankcase which is of importance, and thus any additions thereto for "make up" are to be constituted to replace the vaporized portions.

That which is claimed is:

1. A method for increasing the degree of fuel combustion in an internal combustion engine, comprising the steps of:
    (a) providing an internal combustion engine;
    (b) providing a fuel;
    (c) providing hot vapors from a fuel;
    (d) providing air;
    (e) providing a glycol selected from the group consisting of diethylene glycol, triethylene glycol, propylene glycol, tetraethylene glycol, dipropylene glycol and hexylene glycol;
    (f) introducing said glycol into the crankcase of said internal combustion engine;
    (g) introducing the fumes from said crankcase into a chamber defined by the cylinder heads and a cylinder head cover;
    (h) introducing said hot fuel vapors into said chamber and mixing said hot fuel vapors with said fumes;
    (i) introducing the mixture into the intake manifold of said internal combustion engine;
    (j) introducing said fuel and said air into said intake manifold and mixing said fuel and air with said mentioned mixture; and
    (k) introducing the last mentioned mixture into the combustion chambers of said internal combustion engine.

2. A method as claimed in claim 1 wherein said glycol comprises at least two glycols.

3. A method as claimed in claim 2 wherein said at least two glycols include propylene glycol and dipropylene glycol.

4. A method as claimed in claim 1 including adding a lubricant in said crankcase formulated of elements including glycerine, colloidal graphite, a monohydric alcohol and sodium bicarbonate.

5. A method as claimed in claim 4 including adding to said lubricant a mixture of glycol including diethylene glycol, triethylene glycol, propylene glycol, tetraethylene glycol, dipropylene glycol and hexylene glycol.

6. A method as claimed in claim 5 wherein the constituents by weight of the lubricant mixture are approximately as follows:

| | Percent |
|---|---|
| Methyl alcohol | 10 |
| Diethylene glycol | 5 |
| Triethylene glycol | 5 |
| Glycerine | 39 |
| Propylene glycol | 20 |
| Tetraethylene glycol | 5 |
| Dipropylene glycol | 8 |
| Hexylene glycol | 5 |
| Graphite | 2 |
| Sodium bicarbonate | 1 |

References Cited

UNITED STATES PATENTS

| 2,314,140 | 3/1943 | Graziano | 123—122 |
| 2,460,700 | 2/1949 | Lyons | 123—1 |
| 2,748,758 | 6/1956 | Fairbanks | 123—122 |
| 2,876,750 | 3/1959 | Carr | 123—1 |
| 3,093,124 | 6/1963 | Wentworth | 123—136 |
| 3,172,348 | 3/1965 | Berg | 123—119 XR |
| 3,215,417 | 11/1965 | Whitmore et al. | 123—122 XR |
| 3,329,137 | 7/1967 | Ferrell | 123—119 |
| 3,426,738 | 2/1969 | Goodwine et al. | 123—1 XR |

LAURENCE M. GOODRIDGE, Primary Examiner

U.S. Cl. X.R.

44—77; 123—1, 122, 136